(12) United States Patent
Shimahara et al.

(10) Patent No.: US 8,974,162 B2
(45) Date of Patent: Mar. 10, 2015

(54) ANCHOR BOLT AND PRODUCTION METHOD

(75) Inventors: Hideki Shimahara, Buchs (CH); Mark Winkler, Hohenems (AT); Matthias Wissling, St. Gallen (CH)

(73) Assignee: Hilti Aktiengesellschaft, Schaan (LI)

(\*) Notice: Subject to any disclaimer, the term of this patent is extended or adjusted under 35 U.S.C. 154(b) by 0 days.

(21) Appl. No.: 14/004,654

(22) PCT Filed: Feb. 28, 2012

(86) PCT No.: PCT/EP2012/053320
§ 371 (c)(1),
(2), (4) Date: Jan. 23, 2014

(87) PCT Pub. No.: WO2012/126700
PCT Pub. Date: Sep. 27, 2012

(65) Prior Publication Data
US 2014/0133933 A1 May 15, 2014

(30) Foreign Application Priority Data

Mar. 23, 2011 (DE) .......................... 10 2011 005 999
May 20, 2011 (DE) .......................... 10 2011 076 180

(51) Int. Cl.
| F16B 13/06 | (2006.01) |
| F16B 13/14 | (2006.01) |
| B21H 3/02  | (2006.01) |
| B21H 3/06  | (2006.01) |

(52) U.S. Cl.
CPC .............. *F16B 13/144* (2013.01); *B21H 3/022* (2013.01); *F16B 13/065* (2013.01); *B21H 3/06* (2013.01)
USPC .............................................. 411/51; 411/44

(58) Field of Classification Search
USPC ................ 411/44, 50, 51, 52, 68, 72; 470/12
See application file for complete search history.

(56) References Cited

U.S. PATENT DOCUMENTS

| 750,536 A   | * | 1/1904  | Haggerty ........................ 411/51 |
| 2,955,504 A | * | 10/1960 | Lovrinch et al. ................ 411/51 |
| 3,620,120 A | * | 11/1971 | Warner ........................... 411/51 |
| 3,750,519 A | * | 8/1973  | Lerich ............................ 411/59 |
| 4,474,515 A | * | 10/1984 | Pitzer ............................. 411/16 |

(Continued)

FOREIGN PATENT DOCUMENTS

| CA | 953 958 A1   | 9/1974  |
| EP | 0 627 567 A1 | 12/1994 |

(Continued)

OTHER PUBLICATIONS

International Search Report dated May 22, 2012, with Statement of Relevancy (Three (3) pages).
U.S. Patent Application, "Expansion Anchor", filed Sep. 11, 2013, Inventor Matthias Wissling.

*Primary Examiner* — Roberta Delisle
(74) *Attorney, Agent, or Firm* — Crowell & Moring LLP

(57) ABSTRACT

An anchor bolt for an expansion anchor, and a method of producing the anchor bolt, is disclosed. The anchor bolt has an expansion body which is arranged coaxially with respect to an axis, where a circumferential surface of the expansion body has ribs and grooves in an alternating manner in a circumferential direction. Top surfaces of the ribs diverge from the axis in a direction along the axis. Bottom surfaces of the grooves converge in the direction of the axis.

15 Claims, 3 Drawing Sheets

(56) References Cited

U.S. PATENT DOCUMENTS 4,764,055 A * 8/1988 Clark et al. ............... 405/259.2
6,524,046 B2 * 2/2003 Hsu ............................. 411/61

FOREIGN PATENT DOCUMENTS

| EP | 0 724 085 A1 | 7/1996 |
| EP | 1 243 801 A1 | 9/2002 |

* cited by examiner ated by the radially recessed surface sec-
ANCHOR BOLT AND PRODUCTION METHOD This application claims the priority of International Application No. PCT/EP2012/053320, filed Feb. 28, 2012, and German Patent Documents No. 10 2011 005 999.7, filed Mar. 23, 2011, and 10 2011 076 180.2, filed May 20, 2011, the disclosures of which are expressly incorporated by reference herein.

SUMMARY OF THE INVENTION

The present invention relates to an anchor bolt for an expansion anchor and such an expansion anchor. The invention also relates to a production method for the anchor bolt.

The anchor bolt has an expansion body arranged coaxially with respect to an axis, wherein a circumferential surface of the expansion body has ribs and grooves in an alternating manner in the circumferential direction. Top surfaces of the ribs diverge monotonically from the axis in a direction along the axis. Bottom surfaces of the grooves converge monotonically in the direction of the axis. The bottom surfaces of the ribs and the bottom surfaces of the grooves have an opposite inclination along the axis with respect to the axis.

According to one aspect of the invention, the anchor bolt for an expansion anchor has an expansion body arranged coaxially with respect to an axis. A circumferential surface of the expansion body is inscribed in a first envelope curve that is convex in the circumferential direction and expands radially along a direction along the axis. A second envelope curve that is convex in the circumferential direction and decreases radially along the direction is inscribed in the circumferential surface. In the circumferential direction, the circumferential surface alternatingly has first surface sections, e.g., the top surfaces, which touch the first envelope curve, and second surface sections, e.g., the bottom surfaces, which touch the second envelope curve.

Throughout their entire dimension along the axis, the first surface sections touch the first envelope curve. Along the entire dimension thereof, the second surface sections touch the second envelope curve. The property of an envelope curve that is convex in the circumferential direction is that a connecting line of any two points of the envelope curve lies within the volume enclosed by the envelope curve as long as these two points are selected in a plane perpendicular to the axis. In the case of the envelope curve expanding radially along the direction, a content of a first cross-sectional surface that is perpendicular to the axis is less than a content of a second cross-sectional surface, which is arranged in a displaced manner in the direction parallel to the first cross-sectional surface. To-be-highlighted examples of the convex envelope curves radially expanding or reducing along a direction within the context of the cited anchor bolt are the circumferential surfaces of a cone, a truncated cone, a pyramid, a hemisphere, funnel-shaped bodies concavely curved along the axis, etc.

The second envelope curve lies within the first envelope curve, the two envelope curves are preferably coaxial to each other, for example coaxial to the axis. An inclination of the first surface sections to the axis runs in the opposite direction of an inclination of the second surface sections with respect to the axis. While a radial distance of the first surface sections with respect to the axis increases in the direction, a radial distance of the second surface sections reduces with respect to the axis. The inclinations or angles from the axis can be constant or variable along the axis.

One embodiment provides that the circumferential surface has an annular convex line running in a plane perpendicular to the axis, at which the first surface sections and the second surface sections abut. The first envelope curve and the second envelope curve touch on the convex line. The circumferential surface is smooth in this region, i.e., there are no radially projecting and radially recessed surface sections. The ring is in the direction in front of the two envelope curves or the structured circumferential surface with the first and second surface sections.

According to one embodiment, the anchor bolt has, in a sectional plane, a greatest radial distance of the circumferential surface from the axis, in particular the top surface from the axis, and furthermore, there is, in the sectional plane, a shortest radial distance of the circumferential surface from the axis. The sectional plane is perpendicular to the axis. Moreover, the sectional plane intersects the ribs and the grooves. A first difference between the respectively greatest radial distance and the shortest radial distance can be determined in a first sectional plane. A second difference is determined in a parallel second sectional plane, which is displaced in the direction in which the expansion cone expands. The second difference is greater than the first difference. The difference increases continuously for successive sectional planes along the direction. A content of a cross-sectional surface of the expansion body can be the same in each of the sectional planes.

One embodiment provides that, along the axis, a content of cross-sectional surfaces of the expansion body is the same in more than two planes that are perpendicular to the axis and displaced from each other along the axis, if the planes intersect the ribs and the grooves. The content of the cross-sectional surfaces can be the same for all planes through the first and second surface sections. Despite a changing profile along the axis, the content is preferably constant along the axis. The increase in volume due to the radially projecting surface sections is balanced out by the radially recessed surface sections. In one embodiment, the anchor bolt has a shaft provided with a thread. A content of a cross-sectional surface in a plane perpendicular to the axis and through the thread can be equal to one of the contents of the cross-sectional surfaces through the expansion body.

One embodiment provides that a ratio of a dimension of the first surface section, e.g., of the ribs, determined in the circumferential direction to a dimension of the second surface section e.g., of the grooves, determined in the circumferential direction is between 0.5 and 2. A width of the first and second surface sections is preferably approximately equally great in the indicated ratio. One embodiment provides that a greatest radial distance of the first surface sections with respect to the axis is between ten percent and 25 percent greater than the shortest radial distance of the second surface sections from the axis.

An expansion anchor has one of the described anchor bolts and an expansion sleeve, which encompasses a cylindrical neck of the anchor bolt adjacent to the expansion body. The shaft is furthermore provided with a thread and a nut for example.

According to one aspect of the invention, a production method for an anchor bolt of an expansion anchor uses the following step: rolling out a cylindrical blank on a surface with an applied rolling profile for a structured, conical expansion body. Along a rolling direction, the rolling profile has alternating elevations and depressions, wherein, in a first sectional plane perpendicular to an axis of the blank, the elevations are raised with respect to the depressions by a first rise that is perpendicular to the surface and, in a second sectional plane that is parallel to the first sectional plane and displaced in a direction parallel to the axis, the elevations are raised with respect to the depressions by a second rise that is perpendicular to the surface and the first rise is less than the second rise. The direction points from a region for forming a thread or a neck toward the expansion body. The elevations can rise progressively along the direction from the surface and the depressions can deepen progressively along the direction with respect to the surface.

One embodiment provides that the blank be rolled out over a trapezoidal rolling profile in order to reduce a diameter of the blank to a diameter for a neck of the anchor bolt, and to form a convex, conical transition between the neck and the structured, conical expansion body.

An expansion anchor can be produced by manufacturing an anchor bolt in accordance with the steps described in the foregoing and wrapping a sheet-metal strip around a neck to form a sleeve.

The following description explains the invention on the basis of exemplary embodiments and figures.

DETAILED DESCRIPTION OF THE DRAWINGS

Unless otherwise indicated, the same or functionally equivalent elements are indicated by the same reference symbols in the figures.

Figure 1:
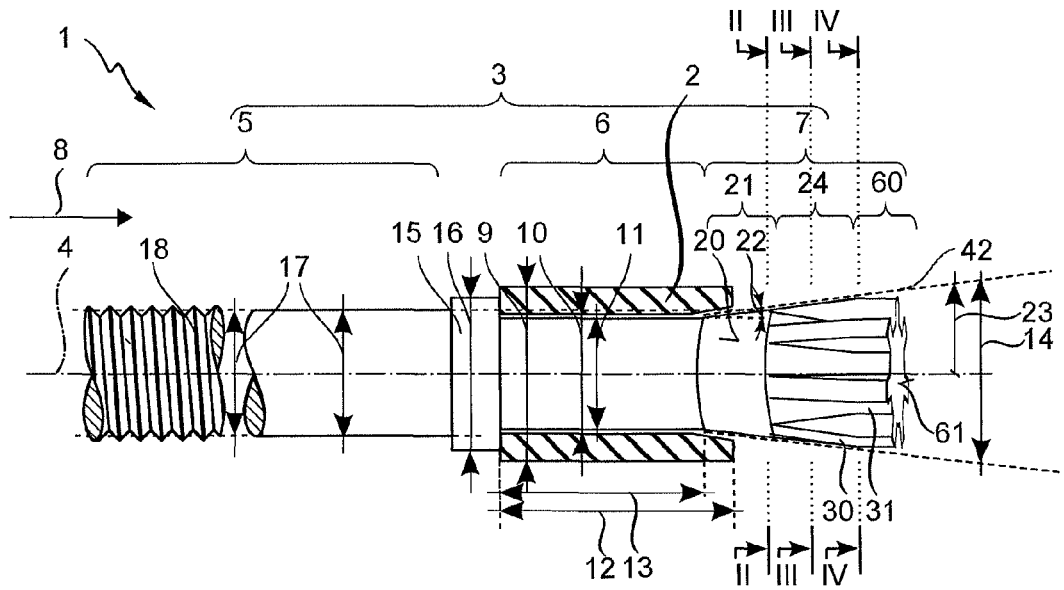
FIG. 1 is a lateral view of an expansion anchor.

FIG. 1 shows a multi-piece expansion anchor 1, which includes an expansion sleeve 2 and an anchor bolt 3. The exemplary anchor bolt 3 is configured as one piece and successively has a shaft 5, a neck 6 and an expansion body 7 along an axis 4. The direction from the shaft 5 to the expansion body 7 is called the placement direction 8 in the following.

The expansion sleeve 2 initially sits on the cylindrical neck 6 of the anchor bolt 3. During placement of the expansion anchor 1, the expansion body 7 of the anchor bolt 3 adjacent to the neck 6 can be driven into the expansion sleeve 2 and expand it in the radial direction. In the process, the expansion sleeve 2 is clamped on the wall of a hole.

The expansion sleeve 2 can be a sheet-metal strip wound around the neck 6. An outer diameter 9 of the expansion sleeve 2 can be the greatest diameter of the multi-part expansion anchor 1. A user will select a diameter of a hole into which the expansion anchor 1 is to be placed equal to the outer diameter 9 of the expansion sleeve 2. The multi-part expansion anchor 1 is inserted into the hole with the expansion body 7 in the forward position. In the process, the expansion sleeve 2 comes into contact with the wall of the hole. The anchor bolt 3 is partially extracted from the hole, thereby driving the expansion body 7 into the expansion sleeve 2. The expansion sleeve 2 initially stops due to friction with the wall and subsequently in the expanded state because of radial force closure with the wall.

The neck 6 is preferably a smooth cylindrical region of the anchor bolt 3. The expansion sleeve 2 is able to move smoothly on the neck 6 along the axis 4. An inner diameter 10 of the expansion sleeve 2 is selected to be somewhat greater than a diameter 11 of the neck 6. A length 12 of the expansion sleeve 2 can be somewhat greater than a length 13 of the neck 6, for example by up to 20 percent.

The expansion body 7 is attached directly to the neck 6. The exemplary expansion body 7 is derived from a conical base body, the outer diameter 14 of which increases continuously or monotonically in the placement direction 8.

The shaft 5 attaches to the neck 6 on the opposite side of the expansion body 7. A collar 15 directly adjacent to the neck 6 can be provided between the shaft 5 and the neck 6 along the axis 4. A diameter 16 of the collar 15 is greater than the inner diameter 10 of the expansion sleeve 2. When inserting the expansion anchor 1 into the hole, the expansion sleeve 2 is present at the collar 15 and is not pulled off along the shaft 5.

The shaft 5 is a substantially cylindrical section of the anchor bolt 3. A diameter of the shaft 5, called the basic diameter 17 in the following, is constant over its entire length. The shaft 5 may be provided with a thread 18.

A diameter averaged over two thread turns of the thread 18, also called the flank diameter, is the same as the basic diameter 17.

A circumferential surface 20 of the expansion body 7 corresponds in a first region 21, which is directly adjacent to the neck 6, to a circumferential surface of a cone. The circumferential surface 20 in the first region 21 has circular cross sections perpendicular to the axis 4. No local depressions, such as indentations, grooves, or projections such as ribs, nubs, etc. are provided. The circumferential surface 20 preferably has an unchanging inclination with respect to the axis 4 along the axis 4, which is indicated by a constant angle 22, e.g., in the range between 5 degrees and 20 degrees, between a tangential plane on the circumferential surface 20 and the axis 4. The outer diameter 14 or radial distance 23 of the circumferential surface 20 from the axis 4 increases proportionally to a distance from the neck 6. The radial distance 23 can increase for example between 10% and 50% along the axis 4, i.e., the radial distance at the end of the inclination is greater by at least 10%, for example less than 50%, than the radial distance at the beginning of the inclination. The inclination or increase of the outer diameter 14 can also be progressive, i.e., the angle 22 increases progressively, the radial distance 23 increases more quickly than proportionally. Alternatively, the increase can also be degressive in sections, e.g., as is the case with a hemisphere.

Figure 2:
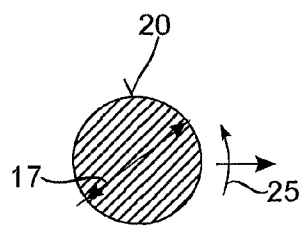
FIG. 2 is a cross section through the anchor in Plane II-II.
Figure 3:
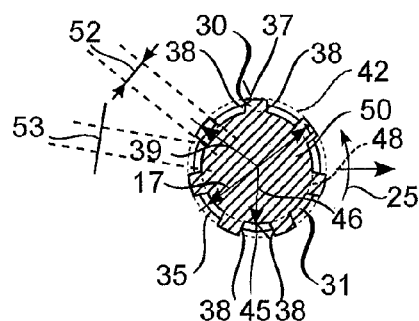
FIG. 3 is a cross section through the anchor in Plane III-III.
Figure 4:
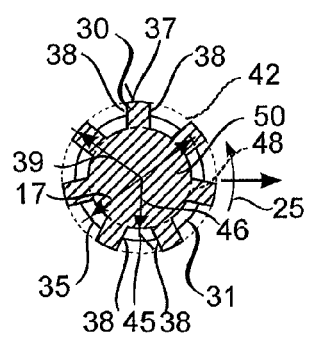
FIG. 4 is a cross section through the anchor in Plane IV-IV.
Figure 5:
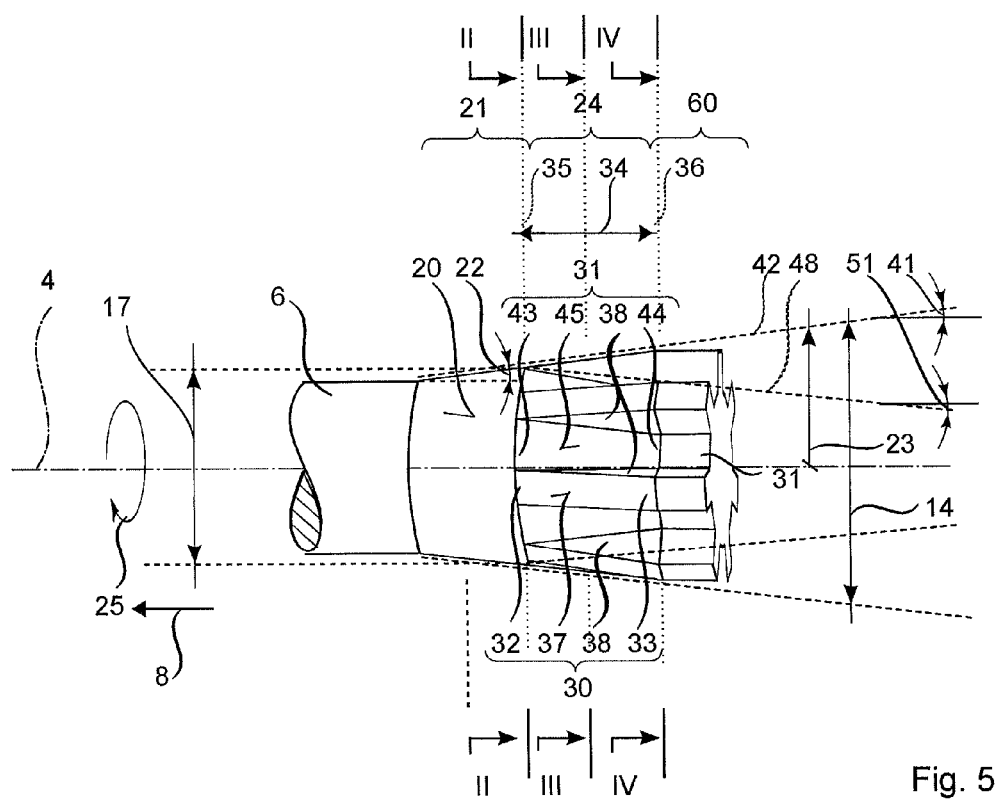
FIG. 5 is an enlarged representation of an expansion body of the expansion anchor.

Following the first region 21 is a second region 24, in which the circumferential surface 20 is structured. Ribs 30 and grooves 31 are arranged in an alternating manner along a circumferential direction 25 around the axis 4. The depicted number of seven ribs 30 and seven corresponding grooves 31 is exemplary; the number is preferably in the range between 5 and 16. FIG. 2 shows a cross section through the expansion body 7 in Plane II-II at the transition from the first region 21 to the second region 24. FIG. 3 shows a cross section in Plane III-III at approximately the center of the second region 24 and FIG. 4 shows a cross section in Plane IV-IV at the end of the second region 24 away from the neck 6. The diameter of the body 7 in Plane II-II can correspond to the basic diameter. FIG. 5 is an enlarged view of the expansion body 7.

The depicted ribs 30 are aligned parallel to the axis 4. A forward end 32 of the ribs 30 is adjacent to the first region 21. A rear end 33 of the ribs 30 is offset with respect to the forward end 32 along the axis 4 in the placement direction. The ribs 30 can all have an equally large dimension 34 along the axis 4, in particular the forward ends 32 of all ribs 30 can lie in a first plane 35 perpendicular to the axis 4 and the rear ends 33 of all ribs 30 can lie in a second plane 36 perpendicular to the axis 4. Each of the ribs 30 has a top surface 37 substantially pointing away radially from the axis 4, which top surface can be flat or curved. The top surface 37 runs continuously from the forward end 32 to the rear end 33. The ribs 30 are completed in the circumferential direction 25 by flanks 38. The flanks 38 are oriented diagonally from the top surface 37, e.g., perpendicularly or at an angle of between 60 degrees and 120 degrees, and run from the top surface 37 inwardly to the axis 4. The flanks 38 can be flat. The top surface 37 of a rib 30 therefore includes the point(s) of each cross section perpendicular to the axis 4 which has/have the greatest radial distance 39 with respect to the axis 4. The top surface 37 includes at least one closed line of these points along the axis 4, i.e., from the forward end 32 to the rear end 33.

The top surfaces 37 are inclined with respect to the axis 4 such that the radial distance 39 between the respective top surface 37 and the axis 4 along the axis 4 increases in the placement direction 8. The radial distance 39 of the rib 30 at the forward end 32 thereof is preferably equal to half of the basic diameter 17. At the rear end 33, the radial distance 39 is greater than half the basic diameter 17 by at least 5%, and a maximum of 20% greater than half the basic diameter 17. The inclination or an angle 41 between the top surface 37 and the axis 4 can be determined in a sectional plane in which the axis 4 lies. The inclination can be constant along the axis 4 as shown. Alternatively, the inclination can be progressive or degressive in sections. However, the slope of the top surfaces 37 is continuously positive in the placement direction 8, i.e., the radial distance 39 increases.

The top surfaces 37 form a conical design of the expansion body 7. The rotational body described by the top surfaces 37 is a truncated cone. The surface area of the rotational body defines an enveloping surface 42. The circumferential surface 20 is inscribed in the second region 24 in the conical enveloping surface 42 in such a way that the top surfaces 37 touch, over the entire dimension thereof, the enveloping surface 42. The top surfaces 37 touch the enveloping surface 42 at least along a continuous line from the forward end 32 up to the rear end 33. The enveloping surface 42 that is convex in the circumferential direction 25 masks out the locally occurring depressions in the circumferential direction 25 because of the grooves 31 and therefore describes the behavior of the circumferential surface 20 that tends to expand in the placement direction 8. A radius or outer diameter 14 of the enveloping surface 42 increases continuously or monotonically along the placement direction 8.

The grooves 31 run by default through the ribs 30 likewise parallel to the axis 4. The forward ends 43 of the grooves 31 can be in the same first plane 35 as the forward ends 32 of the ribs 30. The rear ends 44 of the grooves 31 can lie in the same second plane 36 as the rear ends 33 of the ribs 30. Each of the grooves 31 has a bottom surface 45 that is substantially pointing radially away from the axis 4, which bottom surface can be flat or curved. The bottom surface 45 continuously connects the forward end 43 to the rear end 44 of the groove 31. Two respectively facing flanks 38 border one of the bottom surfaces 45 in the circumferential direction 25. The flanks 38 run outwardly from the bottom surface 45, i.e., away from the axis 4. The bottom surface 45 of a groove 31 therefore includes the point(s) of each cross section perpendicular to the axis 4 which has/have the shortest radial distance 46 from the axis 4.

The bottom surfaces 45 are inclined with respect to the axis 4 such that the radial distance 46 between the respective bottom surface 45 and the axis 4 along the axis 4 decreases in the placement direction 8. The radial distance 46 of the bottom surface 45 at the forward end 43 thereof is preferably equal to half the basic diameter 17. At the rear end 44, the radial distance 46 can be between 5% and 20% less than half the basic diameter 17. An inclination or an angle 51 between the bottom surface 45 and the axis 4 can be determined in a sectional plane in which the axis 4 lies. The inclination can be constant along the axis 4 as shown. Alternatively, the inclination can be progressive or degressive in sections. However, the slope of the bottom surfaces 45 is continuously negative in the placement direction 8, i.e., the radial distance 46 decreases.

In the second section 24, a conical inscribed surface 48 touches the circumferential surface 20 respectively at the bottom surfaces 45. The inscribed surface 48 is completely within the circumscribed volume of the circumferential surface 20, in other words, the inscribed surface 48 and the circumferential surface 20 do not intersect. The inscribed surface 48 is therefore an enveloping surface of the circumferential surface 20 adjacent thereto. The inscribed surface 48 touches each of the bottom surfaces 45 continuously from the forward end 43 thereof up to the rear end 44 thereof. The inscribed surface 48 that is convex in the circumferential direction 25 masks out the locally occurring unevenness in the circumferential direction 25 because of the ribs 30 and therefore describes the behavioral tendency of a core 48 of the expansion body 7. The radius 46 of the inscribed surface 48, or of a core 48, decreases continuously or monotonically along the placement direction 8.

The circumferential surface 20 is delimited radially outwardly by the enveloping surface 42 and radially inwardly by the inscribed surface 48. In the circumferential direction 25, the circumferential surface 20 alternatingly touches the enveloping surface 42 or the inscribed surface 48 with a top surface 37 and a bottom surface 45.

The inclination of the top surfaces 37 and the inclination of the bottom surfaces 45 with respect to the axis 4 are in opposite directions, i.e., the outer diameter of the expansion body 7 increases and the inner diameter 46 of the core 48 decreases. The respective angles 41, 51 can be approximately equally large in terms of amount, for example with a relative deviation of up to 10 percent. The increase in the height of the ribs 30 is balanced out by the grooves 31 becoming deeper. The surface volume of cross sections through the expansion body 7 and perpendicular to the axis 4 remains preferably constant within the second region 24. The surface volume corresponds for example to the volume of a circle with a diameter equal to the basic diameter 17.

A width 52 of the ribs 30 and a width 53 of the grooves 31, i.e., their dimensions in the circumferential direction 25, are preferably similar. For example, the ratio of the two widths 52, 53 is in the range between 0.5 and 2. The widths 52, 53 can be measured at half the radial height of the flanks 38. The width 52 of the ribs 30, indicated in an angular measure, preferably remains equal along the axis 4, and the width 53 of the grooves 31 likewise remains equal.

In the case of the depicted embodiment, all ribs 30 are configured to be the same, in particular each of the top surfaces 37 has the same inclination profile with respect to the axis 4. A variation provides that a rib with a greater average inclination alternates with a rib that has a smaller average inclination.

A third region 60 of the expansion body 7 in which the cross sectional profile remains constant can follow the second region 24. The top surfaces 37 and the bottom surfaces 45 in the third region 60 run parallel to the axis 4. An end face 61 of the anchor bolt concludes the third region 60. The end face 61 may be spherically rounded. The diameter 14 of the anchor bolt 3 increases beginning at the neck 6 continuously up to the possibly spherical end face 61.

The anchor bolt 3 can be rolled for example. A cylindrical blank 70 is cut off of an endless wire. A diameter 71 of the blank 70 preferably corresponds to the diameter 17 of the shaft 5 of the anchor bolt 3 being produced. Because the blank 70 is elongated during rolling, a length of the blank 70 is shorter than the length of the anchor bolt 3 being produced.

Figure 6:
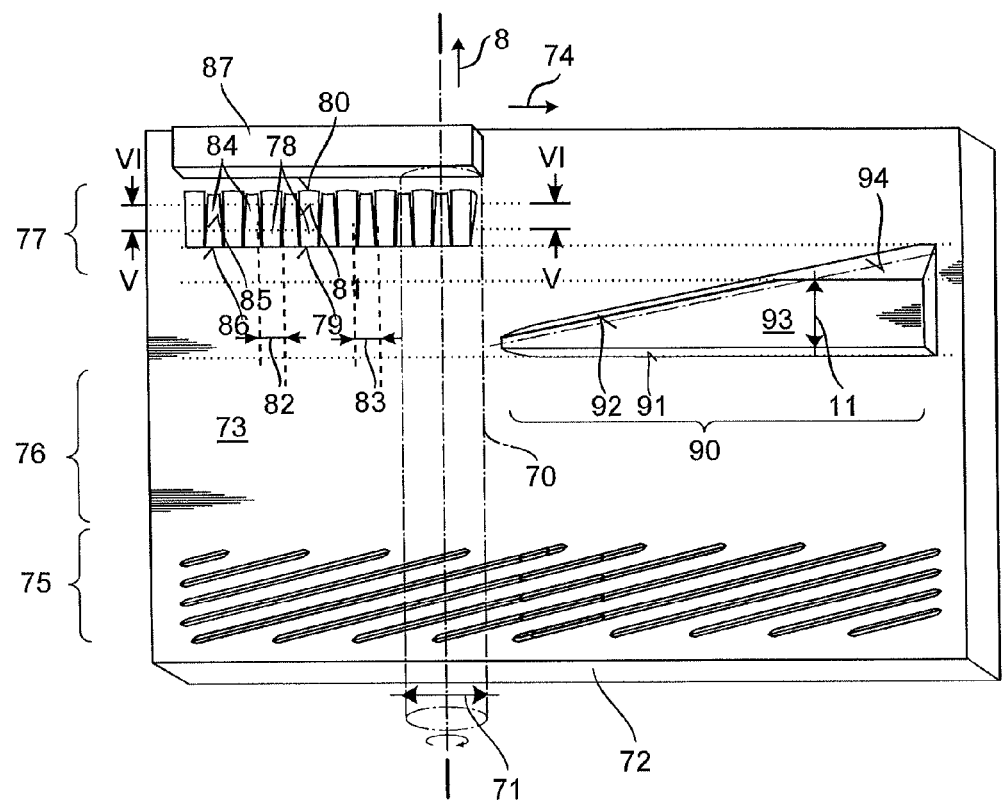
FIG. 6 is a rolling profile for producing an anchor bolt.

The anchor bolt 3 is rolled out of the blank 70. A rolling profile for the anchor bolt 3 is shown exemplarily on a jaw roller 72 in FIG. 6. A rolling machine can also have the profile wound on rollers instead of on jaw rollers.

Elevated and sunken structures for a rolling profile are provided on a flat surface area 73 of the jaw roller 72. The blank 70 is rolled along a rolling direction 74 over the rolling profile on the surface area 73. A second jaw roller, preferably with an analogous rolling profile, presses the blank 70 perpendicularly on the rolling profile.

The rolling profile is subdivided into different strip-shaped regions extended along the rolling direction 74 in accordance with the structures of the anchor bolt 3 to be produced and the arrangement thereof along the axis 4 of the anchor bolt 3. A first region 75 can be provided for example with a profile for rolling the thread 18. A second region 76 can be configured in a flat manner without structures for example, which leaves the blank 70 unchanged for the shaft 5 to be produced for example. A third region 77 serves to produce the expansion body 7.

The expansion body 7 is fabricated in two consecutive rolling steps for example. The ribs 30 and grooves 31 are impressed into the blank 70 in a first step.

A plurality of wedge-shaped elevations 78 are arranged on the surface area 73 parallel to one another and offset from one another along the rolling direction 74. For the purposes of illustration, the number of elevations 78 is considerably reduced as compared to a real rolling profile. Each of the elevations 78 has a pointed end 79 at which the elevation 78 essentially merges into the flat surface area 73, and a blunt end 80 at which the elevation 78 is raised the most above the surface area 73. The pointed ends 79 of the elevations 78 lie preferably on a line parallel to the rolling direction 74; the blunt ends 80 can also lie on a line parallel to the rolling direction 74. A pointed end 79 and a blunt end 80 of an elevation 78 are disposed in displaced manner perpendicular to the rolling direction 74, for example there is, as shown, no offset between the pointed end 79 and the blunt end 80 along the rolling direction 74. A surface 81 that is diagonal with respect to the surface area 73 runs from the pointed end 79 to the blunt end 80. An angle of inclination between the surface area 73 and the diagonal surface 81 is in the range of between 5 degrees and 30 degrees for example. The inclination can be constant or vary, however, it remains positive from the pointed end 79 to the blunt end 80. The inclination of the diagonal surface 81 can increase from one elevation 78 to the next elevation 78 along the rolling direction 74. A width 82 of the elevations 78, i.e., its dimension along the rolling direction 74, preferably remains constant or approximately constant. A distance 83 between the elevations 78 can be equal or approximately equal to the width 82 of the elevations 78 or these dimensions can be in a ratio of between 0.5 and 2.

A depression 84 is introduced in the surface area 73 between the elevations 78. The depression 84 can also be configured to be wedge-shaped, wherein the wedge shape describes the complementary shape between the flat surface area 73 and a diagonal surface 85 of the depression 84. Pointed ends 86 of the depression 84 lie on the same line as the pointed ends 79 of the elevations 78. The depression 84 merges at the pointed ends 79 into the flat surface area 73. The diagonal surface 85 of the depression 84 is inclined with respect to the surface area 73, wherein an algebraic sign of the inclination is opposite from an algebraic sign of the inclination of the diagonal surface 81 of the elevations 78.

Along a first Line V-V parallel to the rolling direction 74 through the elevations 78 and depression 84, the rolling profile is alternatingly below the surface area 73 and above the surface area 73. Along a second Line VI-VI, which is parallel to the first line and offset thereto in the direction of the blunt ends 79, the rolling profile is likewise alternatingly below the surface area 73 and above the surface area 73, however, with a greater rise. The rise preferably increases continuously with an increasing offset of the second Line VI-VI with respect to the first Line VI-VI in the direction of the blunt end 79.

The blunt ends 80 conclude the rolling profile at the one side. A guide 87 for the blank 70 can abut the blunt ends 80 along the axis 4 in order to prevent an axial shifting of the blank 70 during rolling.

Figure 7:
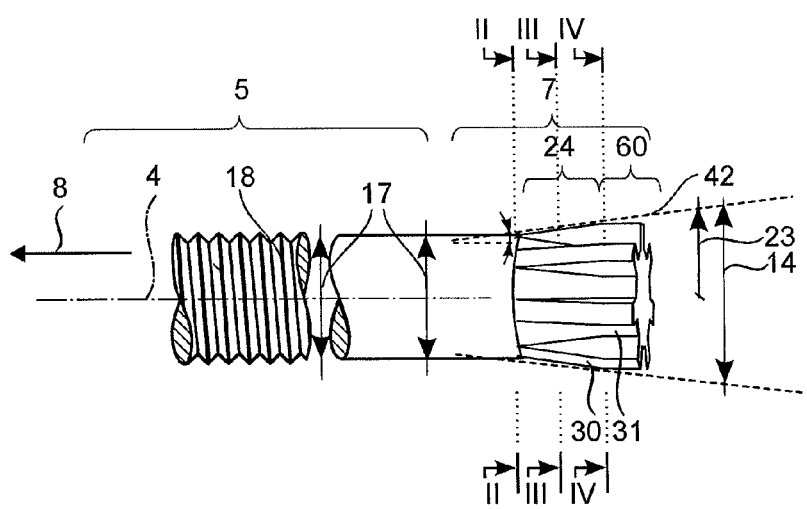
FIG. 7 is a blank partially formed by the rolling profile.

The elevations 78 impress the grooves 31 into the blank 70. The material from the grooves 31 is distributed in the circumferential direction 25 or the rolling direction 74, and the ribs 30 can thereby form in approximately the shape of the depressions 84. The blank 70 can be supported along the axis 4 during rolling over the elevations 78 and depressions 84. Alternatively, the blank 70 can be held perpendicular to the rolling direction 74 by frictional forces. This can encourage a flow of the material from the grooves 31 in longitudinal direction of the blank 70 to the benefit of a build-up of the ribs 30. FIG. 7 indicates the shape of a partially formed blank 70 in the position depicted in FIG. 6.

The smooth conical section 21 of the expansion body 7 can be rolled together with the neck 6. A trapezoidal rolling profile 90 is raised with respect to the surface area 73. The rolling profile 90 has two flanks 91, 92, whose distance along an axis 4 of the blank 70 increases continuously in the rolling direction 74. The distance of the flanks 91 increases up to the length of length of the neck 6. The first of the flanks 91 can be parallel to the rolling direction 74; the second of the flanks 92 is inclined with respect to the rolling direction 74. An inclination of the flanks 91, 92 can be greater than 60 degrees and is preferably constant. The flanks 91, 92 elongate the blank 70 in order to reduce the region for the neck 6 to the desired diameter 11. A surface 93 between the flanks 91, 92 is preferably flat and parallel to the surface area 73.

Following the second flank 92 along the rolling direction 74 is a third flank 94 whose inclination is less with respect to the surface area 73. The third flank 94 begins when the distance, measured perpendicular to the rolling direction 74, of the first flank 91 with respect to the second flank 92 is equal to the length of the neck 6. The third flank 94 can be a flat surface. The inclination of the third flank 94 with respect to the surface area 73 is adapted to the angle 22 of the smooth section 21 of the expansion body 7. An outermost point of the third flank 94 related to the axis 4 of the blank 70 coincides with the line of pointed ends 79. The third flank 94 reduces the blank 70 along its axis 4 until adjacent to the regions 24 structured as ribs 30 and grooves 31.

The section with the elevations 78 and depressions 84 for creating the ribs 30 and the rolling profile 90 for creating the smooth conical section 21 can be arranged on a roller die or a plurality of roller dies. The invention is also not restricted to the sequence thereof. A further embodiment provides for the smooth conical section 21 and the ribs 30 to be formed simultaneously. A distance of the elevations 78 from the flank 92, measured along the axis 4, remains preferably constant in the process. The elevations 78 are therefore arranged along a line diagonal to the rolling direction 74, the Lines V-V, VI-VI run parallel to the flank 92.

The invention claimed is:

1. An anchor bolt for an expansion anchor, comprising:
    a shaft;
    a neck; and
    a conical expansion body arranged coaxially with respect to an axis, wherein a circumferential surface of the expansion body has alternating ribs and grooves in a circumferential direction, wherein respective top surfaces of the ribs diverge from the axis in a direction along the axis, and wherein respective bottom surfaces of the grooves converge toward the axis in the direction along the axis; and
    wherein the circumferential surface of the expansion body is inscribed in a first envelope curve that is convex in the circumferential direction and expands radially along the direction along the axis, wherein a second envelope curve that is convex in the circumferential direction and decreases radially along the direction is inscribed in the circumferential surface, and wherein the circumferential surface in the circumferential direction alternatingly touches the first envelope curve with the top surfaces and the second envelope curve with the bottom surfaces.

2. The anchor bolt according to claim 1, wherein a first difference between a greatest radial distance of the circumferential surface from the axis and a shortest radial distance of the circumferential surface from the axis determined in a first sectional plane, which intersects the ribs and the grooves perpendicular to the axis, is less than a second difference between a greatest radial distance of the circumferential surface and a shortest radial distance of the circumferential surface in a second sectional plane that is parallel to the first sectional plane and that is displaced in the direction.

3. The anchor bolt according to 2, wherein a content of a cross-sectional surface of the expansion body is the same in each of the sectional planes.

4. The anchor bolt according to claim 3, wherein the content corresponds to a content of a cross-sectional surface through the shaft of the anchor bolt.

5. The anchor bolt according to claim 1, wherein a difference between a greatest radial distance of the circumferential surface from the axis and a shortest radial distance of the circumferential surface from the axis determined in respectively successive sectional planes in the direction increases continuously.

6. The anchor bolt according to claim 1, wherein an amount of an inclination of the top surfaces with respect to the axis corresponds to an amount of an inclination of the bottom surfaces with respect to the axis.

7. The anchor bolt according to claim 1, wherein a ratio of a dimension of the top surfaces determined in the circumferential direction to a dimension of the bottom surfaces determined in the circumferential direction is between 0.5 and 2.

8. The anchor bolt according to claim 1, wherein a greatest radial distance of the top surfaces from the axis is between ten percent and fifty percent greater than a shortest radial distance of the bottom surfaces from the axis.

9. The anchor bolt according to claim 1, wherein the circumferential surface has a smooth conical section that expands in the direction, wherein the conical section is completely convex in the circumferential direction, and wherein the ribs and the grooves follow this section in the direction.

10. The anchor bolt according to claim 9, wherein an inclination of the circumferential surface in the smooth conical section with respect to the axis is equal to an inclination of the top surfaces of the ribs with respect to the axis.

11. An expansion anchor that has an anchor bolt according to claim 1 and an expansion sleeve, wherein the expansion sleeve is disposed around the neck of the anchor bolt.

12. A method of producing an anchor bolt of an expansion anchor, comprising the steps of:
    rolling out a cylindrical blank on a surface with an applied rolling profile for a structured, conical expansion body, which along a rolling direction has alternating elevations and depressions, wherein, in a first sectional plane perpendicular to an axis of the blank, the elevations are raised with respect to the depressions by a first rise that is perpendicular to the surface and, in a second sectional plane that is parallel to the first sectional plane and is displaced in a direction parallel to the axis, the elevations are raised with respect to the depressions by a second rise that is perpendicular to the surface, wherein the first rise is less than the second rise.

13. The method according to claim 12, wherein the elevations along the direction rise progressively from the surface and wherein the depressions along the direction deepen progressively with respect to the surface.

14. The method according to claim 12, wherein the blank is rolled out over a trapezoidal rolling profile in order to reduce a diameter of the blank to a diameter for a neck of the anchor bolt, and to form a convex, conical transition between the neck and the structured, conical expansion body.

15. The method according to claim 12, further comprising the step of forming a sleeve by winding a sheet-metal strip around a neck of the anchor bolt.

\* \* \* \* \*